(12) United States Patent
Basart et al.

(10) Patent No.: US 8,451,714 B2
(45) Date of Patent: May 28, 2013

(54) PSTN BYPASS FOR IP MEDIA

(75) Inventors: Edwin J. Basart, Los Altos, CA (US); Greg T. Sueoka, Menlo Park, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 483 days.

(21) Appl. No.: 12/053,809

(22) Filed: Mar. 24, 2008

(65) Prior Publication Data
US 2009/0238194 A1  Sep. 24, 2009

(51) Int. Cl.
*H04L 12/26* (2006.01)

(52) U.S. Cl.
USPC ............................ 370/217; 370/225; 370/352

(58) Field of Classification Search
USPC ................ 370/216, 217, 218, 219, 220, 225, 370/227, 228, 352, 353, 354, 355, 356, 465, 370/466
See application file for complete search history.

(56) References Cited

U.S. PATENT DOCUMENTS

| | | | |
|---|---|---|---|
| 6,510,219 B1 * | 1/2003 | Wellard et al. | 379/221.01 |
| 6,868,080 B1 | 3/2005 | Umansky et al. | |
| 6,876,627 B1 * | 4/2005 | Rao | 370/230 |
| 6,879,582 B1 | 4/2005 | Dhara et al. | |
| 6,973,091 B1 * | 12/2005 | Hester | 370/401 |
| 7,103,067 B1 * | 9/2006 | Singh et al. | 370/467 |
| 7,197,029 B1 | 3/2007 | Osterhout et al. | |
| 7,215,643 B2 * | 5/2007 | Mussman et al. | 370/237 |
| 7,359,702 B2 * | 4/2008 | Kirkpatrick | 455/426.1 |
| 7,424,006 B1 * | 9/2008 | Schlesener et al. | 370/352 |
| 7,564,835 B1 * | 7/2009 | Grabelsky et al. | 370/352 |
| 7,613,170 B1 * | 11/2009 | Grabelsky et al. | 370/352 |
| 7,707,592 B2 | 4/2010 | Wesslén et al. | |
| 7,715,413 B2 * | 5/2010 | Vaziri et al. | 370/401 |
| 7,782,901 B2 | 8/2010 | Wang | |
| 7,856,007 B2 * | 12/2010 | Corcoran | 370/349 |
| 7,865,172 B2 | 1/2011 | Blair et al. | |
| 7,870,290 B2 * | 1/2011 | Kruger et al. | 709/239 |
| 7,924,825 B2 * | 4/2011 | Dowling et al. | 370/356 |
| 8,149,787 B2 * | 4/2012 | Gazzard | 370/331 |
| 2001/0005382 A1 * | 6/2001 | Cave et al. | 370/352 |
| 2002/0101860 A1 * | 8/2002 | Thornton et al. | 370/352 |
| 2004/0022237 A1 * | 2/2004 | Elliott et al. | 370/356 |
| 2004/0114515 A1 * | 6/2004 | Kim | 370/230 |
| 2004/0190497 A1 * | 9/2004 | Knox | 370/352 |
| 2004/0223498 A1 | 11/2004 | Sanderson et al. | |
| 2005/0174935 A1 | 8/2005 | Segel | |
| 2005/0243820 A1 | 11/2005 | Chen | |

(Continued)

OTHER PUBLICATIONS

International Search Report, PCT/US10/62257, Feb. 7, 2011, 7 pages.

*Primary Examiner* — Kevin Mew
(74) *Attorney, Agent, or Firm* — Patent Law Works LLP

(57) ABSTRACT

A system and method for using a PSTN as a fallback for the IP media when the IP network cannot pass the media acceptably and while continuing to use the IP network for call control and other features. In one embodiment, a call controller has a media monitoring module, a bypass module and a PSTN control module. Once a call has been established between endpoints using a primary IP network, the media monitoring module monitors for degradation in call quality. If degradation in call quality is detected, the bypass module transfers the data communication to a secondary network such as a PSTN while the call control continues to be over the primary network. The present invention also includes a variety of methods including a method for falling back to a secondary network and a method for dynamically switching between a primary and a secondary network to ensure call quality.

29 Claims, 15 Drawing Sheets

U.S. PATENT DOCUMENTS

| | | |
|---|---|---|
| 2005/0272465 A1 | 12/2005 | Ahmavaara et al. |
| 2006/0050686 A1* | 3/2006 | Velez-Rivera et al. ........ 370/352 |
| 2006/0067513 A1* | 3/2006 | Maytal et al. ................. 379/395 |
| 2006/0095199 A1 | 5/2006 | Lagassey |
| 2007/0058790 A1* | 3/2007 | Wynn ......................... 379/88.17 |
| 2007/0121604 A1* | 5/2007 | Chandra et al. .............. 370/356 |
| 2007/0223444 A1* | 9/2007 | Foo et al. ...................... 370/349 |
| 2007/0232237 A1* | 10/2007 | Croak et al. ................ 455/67.14 |
| 2008/0005156 A1* | 1/2008 | Edwards et al. .............. 707/102 |
| 2008/0010672 A1 | 1/2008 | Buffmire |
| 2008/0049650 A1* | 2/2008 | Coppage et al. ............. 370/310 |
| 2008/0182616 A1 | 7/2008 | Connors et al. |
| 2009/0111406 A1 | 4/2009 | Posti et al. |
| 2009/0141682 A1 | 6/2009 | Zou et al. |

* cited by examiner

PSTN BYPASS FOR IP MEDIA

BACKGROUND OF THE INVENTION

1. Field of the Invention

The present invention relates to telephony such as that using Voice over Internet Protocol (VoIP). In particular, the present invention relates to a call control method for falling back to a secondary network when there is insufficient quality on a primary network. Still more particularly, the present invention relates to a call control method for falling back from an IP network to a secondary network such as a public switched telephone network (PSTN).

2. Description of the Background Art

Long distance data communication became extremely popular with the acceptance of the Internet Protocols and the Internet. Commonly, the Internet was used for data consisting of email or files for web browsing, but not for voice telephone calls. As IP networks improved, telephone calls became an addition to Internet traffic. But there are problems using the Internet for telephone calls, as the IP technology breaks up a call into packets, which may have to compete with other data, unlike the PSTN, which uses a dedicated, circuit-switched network connection for a call. Once a telephone call is established, the PSTN provides calls with very understandable speech and with very high reliability. IP networks must have high enough bandwidth to pass calls, and in addition have either a priority mechanism to favor voice traffic or enough extra bandwidth to avoid losing or delaying packets, which degrade the quality and understandability of a voice call.

IP telephony is used as it is frequently lower cost than PSTN calls, and for businesses, equipment for IP telephony may be lower cost than previously used circuit-switched equipment. IP telephony equipment may also have lower maintenance cost than circuit-switched equipment. Advanced telephony features can be provided at no extra cost from an IP network, as features are just packets, whereas circuit-switched networks tend to charge extra for features.

An example of an advanced set of features (called advanced features from here on out) is an IP phone at a remote location from the main business. The IP phone uses the IP network for a range of advanced features such as transfer, conference and directory listing. The phone also uses the IP network for its graphical user interface (GUI). As the user looks up another user in the directory, the graphical user interface can display the presence information of the other user—for instance, whether the user is on the phone or out of the office. Features such as transfer and conference may be purchasable at extra cost from the PSTN, but more advanced features such as the graphical user interface may not be available at all, giving the IP phone an advantage over previous circuit-switched technology. For example, the GUI can also be used to indicate whether the user has voice mail, and allow the user to select and listen to a particular message. On low quality IP networks the message can be retrieved via file transfer and then played locally on the IP phone, providing high voice quality. Similarly, Instant Messaging (IM) and Text Messaging—sometimes implemented with Short Message Service (SMS)—are features that can be incorporated into an IP phone but are not offered on the PSTN.

Another advanced feature example is an auto attendant at a remote location from the main business. The remote location uses PSTN lines for local numbers, allowing customers to make low-cost local calls to contact the business. A customer calling the remote location is connected to an auto attendant offering destination options. By connecting the remote office to the main business with IP telephony, the customer can request an operator, and the operator can be located as the main business. The operator can take the call on the IP network, and then transfer the call to a user at the remote location using the IP network. The PSTN call remains connected to the remote office and requires no additional extra-cost features from the PSTN.

The prior art has attempted to provide fault tolerance to IP telephony networks by using PSTN such as described in U.S. Pat. No. 6,868,080 entitled "Voice over internet protocol call fallback for quality of service degradation". For example, there are instances when the IP network is completely down, or unable to transmit IP call control. In this case to make a call, IP telephony is abandoned, and calls are placed entirely on the PSTN and have only PSTN functionality. The benefits of IP call control are lost in this instance.

In both of the above examples, the IP network can reliably provide the features required, but may have difficulty providing the quality needed for the media of the phone call. Thus, there is a need for a mechanism to improve the quality of calls made over an IP telephony network and retaining the advanced features offered by the IP telephony network.

SUMMARY OF THE INVENTION

The present invention overcomes the deficiencies and limitations of the prior art by providing a system and method for falling back to a secondary network when there is insufficient quality on a primary network. In particular, the present invention uses a PSTN as a fallback for the IP media when the IP network cannot pass the media acceptably and while continuing to use the IP network for call control and other features. In one embodiment, the present invention includes a call manager having a media monitoring module, a bypass module and a PSTN control module. Once a call has been established between endpoints using a primary IP network, the media monitoring module monitors for degradation in call quality. If degradation in call quality is detected, the bypass module is activated to transfer the data communication to a secondary network such as a PSTN while the call control continues to be over the primary network. The present invention also includes a variety of methods including a method for falling back to a secondary network and a method for dynamically switching between a primary and a secondary network to ensure call quality.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
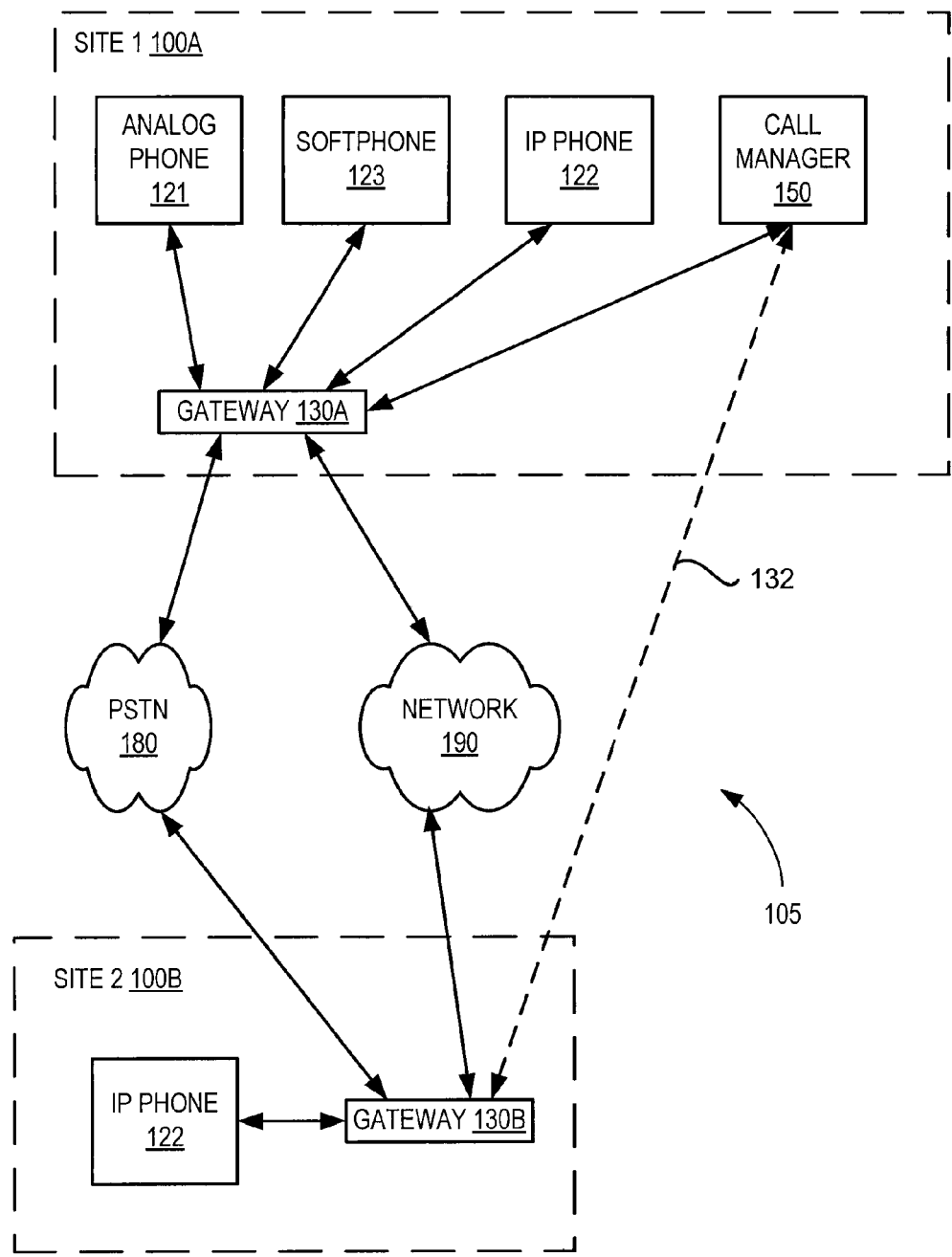
FIG. 1 is a high-level block diagram illustrating a functional view of a distributed telephony system according to one embodiment of the present invention.

A system and method for falling back to a secondary network to ensure call quality is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Enterprises often have several offices or call centers that are located in a plurality of disparate locations. To interconnect all of these sites, enterprise telephony systems have been developed. Enterprise telephony systems, which comprise a set of voice switches and servers, offer enterprise applications enabled by the integration of computer systems with telephony services. The software that supports the computer-integrated functionality is generally implemented as a client-server environment in which the participants or clients (distributed telephony users) communicate with a server. Computer-integrated features rely not only on a server's application platform but also on the availability of the network that connects the switches, servers and application services.

FIG. 1 illustrates a block diagram of a distributed telephony system 105 according to one embodiment of the present invention. The illustrated embodiment of the distributed telephony system 105 includes a first site 100A and a second site 100B. As used herein, a site represents a grouping of resources. In the illustrated embodiment, the two sites 100A, 100B are communicatively coupled via a PSTN network 180 and an IP network 190. One skilled in the art will note that sites 100A, 100B can be physically distinct from each other or merely topology-related groupings that are not in physically distinct locations. The system 105 of FIG. 1 is used only by way of example. While FIG. 1 illustrates two sites, the present invention applies to any system architecture containing one or more sites.

The first site 100A includes a first gateway 130A, three endpoints (analog phone 121, IP phone 122, and softphone 123), and a device such as a server running a call manager software application 150. The first gateway 130A represents a Voice over Internet Protocol (VoIP) device to which a number of endpoints can be coupled, such as analog phones 121, IP phones 122, and softphones 123. In the illustrated embodiment, the first gateway 130A is coupled to the network 190. The first gateway 130A is also coupled to the public switched telephone network (PSTN) 180 via an analog or digital trunk line (e.g., a T1 or E1 interface). In the illustrated configuration, the first gateway 130A provides an interface for calls originating from or terminating on the PSTN 180.

An endpoint enables a user to carry on a phone call. Although in the illustrated embodiment the first site 100A has three endpoints (one analog phone 121, one IP phone 122A, and one softphone 123), in other embodiments the first site 100A has different numbers and types of endpoints. An endpoint may be an IP phone, a softphone on a personal computer, a softphone running on a mobile device, a computer running a telephony application such as voice mail or a gateway. An endpoint is coupled to the gateway 130A. Each of the endpoints can also include a display device (not shown) that is used in conjunction with the phone of the endpoint.

An endpoint has a user interface to send data to and receive data from a user. The analog phone 121 has, for example, a Telephone User Interface (TUI) that receives input data from a key pad and sends data to the gateway. The IP phone 122 has, for example, both a TUI and a graphical user interface that sends data through a display device associated with the IP phone 122. In one embodiment, the IP phone's graphical user interface also receives data from a touch screen display device associated with the IP phone 122. The softphone 123 has, for example, a software application that runs on a computer and sends data through a display device and a speaker and receives data through a microphone, a keyboard, and a pointing device.

A device or server running a call manager software application 150 (call manager 150), such as a computer, controls one or more endpoints with which it is associated. Call manager 150 offers a user an interface through which he can perform call-related functions. While shown as operational as a separate module in this embodiment and FIG. 1, those skilled in the art will recognize that in other embodiments, the call manager 150 may be operational as part of the gateway 130.

The call manager 150 can control a gateway 130B remote from the site 100A as indicated by dash line 132.

One skilled in the art will appreciate that additional networking devices (not shown) can be added to the first site 100A, for example, if needed to support additional endpoints, servers 110 or other systems. One skilled in the art will also recognize that numerous configurations of switches 130 and communications links are contemplated. For example, PSTN links can be coupled to multiple switches 130 at several points within the topology and soft-switches 130 can also be used.

In one embodiment, the gateway 130A is configured to implement features or functions of the present invention. The gateway 130A includes a processor. The processor can be a conventional processing device, such as a general-purpose microprocessor. The gateway 130A also includes a memory. The memory also includes software and routines (not shown) conventionally used to operate a gateway 130A in a VoIP telephony system. For example, the gateway 130A includes software routines for performing call monitoring, transferring calls, placing calls on hold, establishing hunt groups, automated attendant functions, etc. The memory also includes program instructions or functional units that implement the features of the present invention. The gateway 130A also includes a call manager (See also FIG. 8).

The second site 100B similarly includes an endpoint (IP phone 122) and a second gateway 130B. The configuration of the second site 100B demonstrates that a call manager is not required for each site. The second gateway 130B of the second site 100B can be managed by call manager 150 that is illustrated in the first site 100A as denoted by dashed line 132. A call can involve more than one gateway 130A, 130B. For example, a call that originates from the PSTN 180 and terminates on an endpoint that is communicatively coupled to second gateway 130B of the second site 100B involves two gateways: a first gateway 130A of the first site 100A and second gateway 130B of the second site 100B. In addition, each gateway 130A, 130B can be managed by a different call manager 150. A gateway 130A, 130B may not be required for a call; a call from one IP endpoint to another requires only the call manager 150 and the endpoints.

In one embodiment of the present invention, the network 190 is a partially public or a wholly public network such as the Internet. The IP network is preferably a wide area network. The IP network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the present invention, the network 190 is an IP-based wide or metropolitan area network.

Basic Fallback Example

Figure 2A:
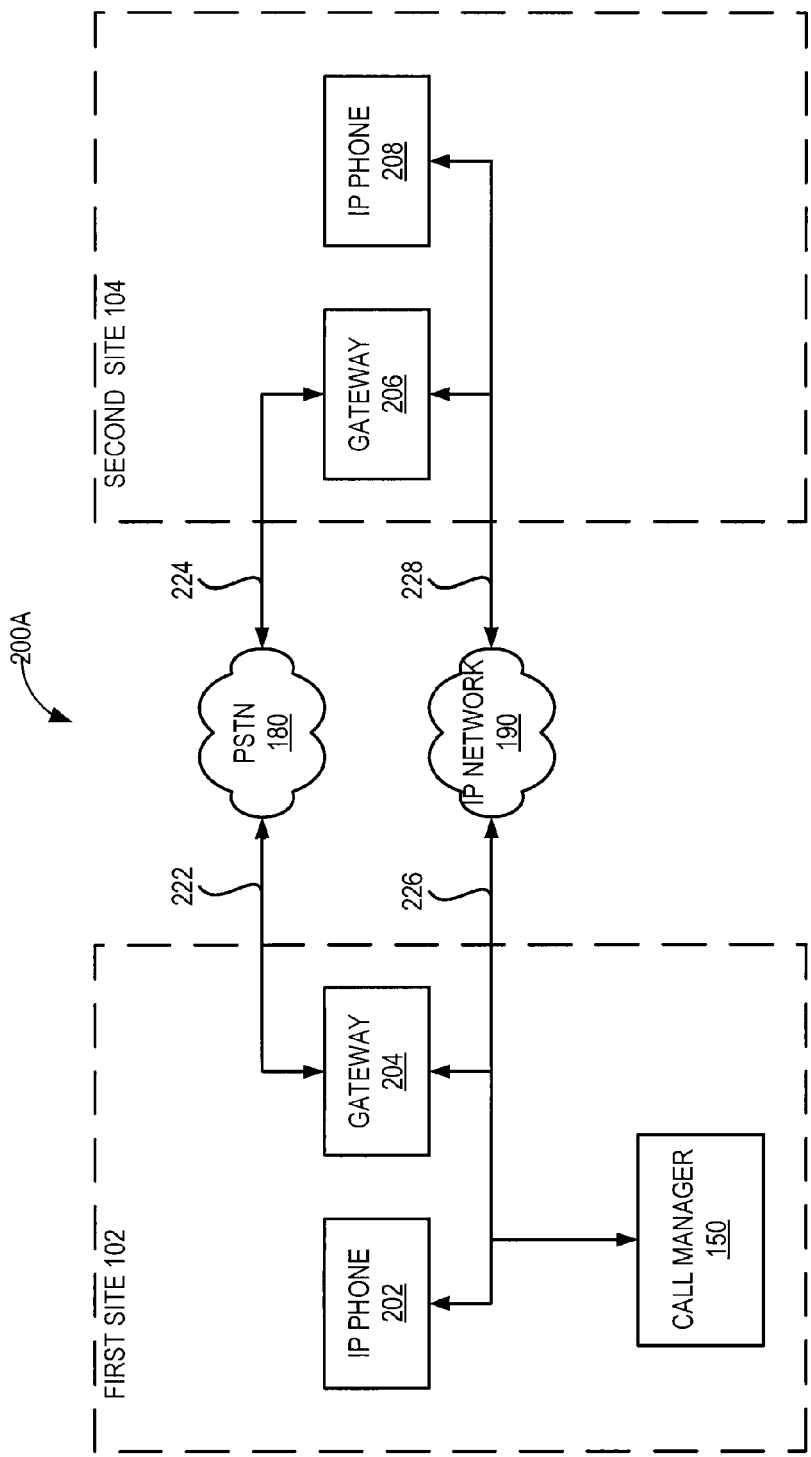
FIGS. 2A-2C are block diagrams illustrating a system having a first site and a second site configured according to different embodiments of the present invention.

Referring now to FIGS. 2A-4, a first, basic embodiment 200A of the present invention is described. FIG. 2A illustrates an example configuration 200A of a first site 102 coupled to a second site 104 by both an IP network 190 and a PSTN 180. The first site 102 further comprises an IP phone 202, a gateway 204 and a call manager 150 coupled by a signal line 226 to the IP network 190. The gateway 204 of the first site 102 is also coupled to the PSTN 180 by a signal line 222. A gateway 204 is a device that can interconnect the PSTN 180 to an IP network 190. A common use of a gateway is to enable IP phones to make calls to the PSTN or vice versa. Calls are set up by the call manager 150, a call control process that sets up and controls calls, and may also implement advanced features mentioned previously. While shown as the call manager 150, call control can be anywhere on the IP network 190—at any site or at another separate location as will be described for other embodiments in FIGS. 2B, 2C, 5-7 and 10 in which call control is embedded in phones or gateways for single call control for all devices or a peer to peer form. In one embodiment, call control is software that may run in the gateway 204 or in another embodiment, an external piece of hardware that may be a dedicated device or a computer.

While the present invention will now be described in the context of two sites 102, 104 and two IP phones 202, 208, the present invention is applicable to two or more sites since the technique works for any number of sites pair wise and can be made to work for 3-way and n-way conferencing.

The second site 104 includes a gateway 206 and IP phone 208 coupled to the IP network 190 by signal line 228. The gateway 206 of the second site 104 is also coupled to the PSTN 180 by signal line 224. Those skilled in the art will recognize that FIG. 2A illustrates a very simple configuration and that either site 102, 104 may include any number of gateways having additional couplings to other networks and additional endpoints. The use of the two endpoints, IP phone 202 and IP phone 208, is for convenience and ease of understanding, and more typical architectures will include tens or even hundreds of endpoints at each site. Those skilled in the art will recognize that each site 102, 104 may also include any other components conventionally included in a distributed IP telephony system.

In an IP environment calls are placed between endpoints 202, 208. When a user makes a call by dialing a number from IP endpoint 202 the destination IP endpoint 208 will be contacted with a message indicating an incoming call. If the destination accepts the call, the endpoints 202, 208 exchange media address information and then send media to each other, creating a call between the endpoints. Media in this case means the voice portion of the call, and the media address is the where the sending endpoint sends the media for the call—and where the destination endpoint is to listen (In practice, it may be the media address of where the endpoint wishes to listen.). For illustration, a common implementation for sending voice on the IP network 190 is RTP (Real Time transport Protocol, IETF RFC 1889, January 1996). In this protocol the media address information is an IP port number, and voice—called media in an IP context—is placed in the IP packet along with the port number. Those skilled in the art will recognize then media may also include video or other still images transferred between the endpoints.

Figure 2B:
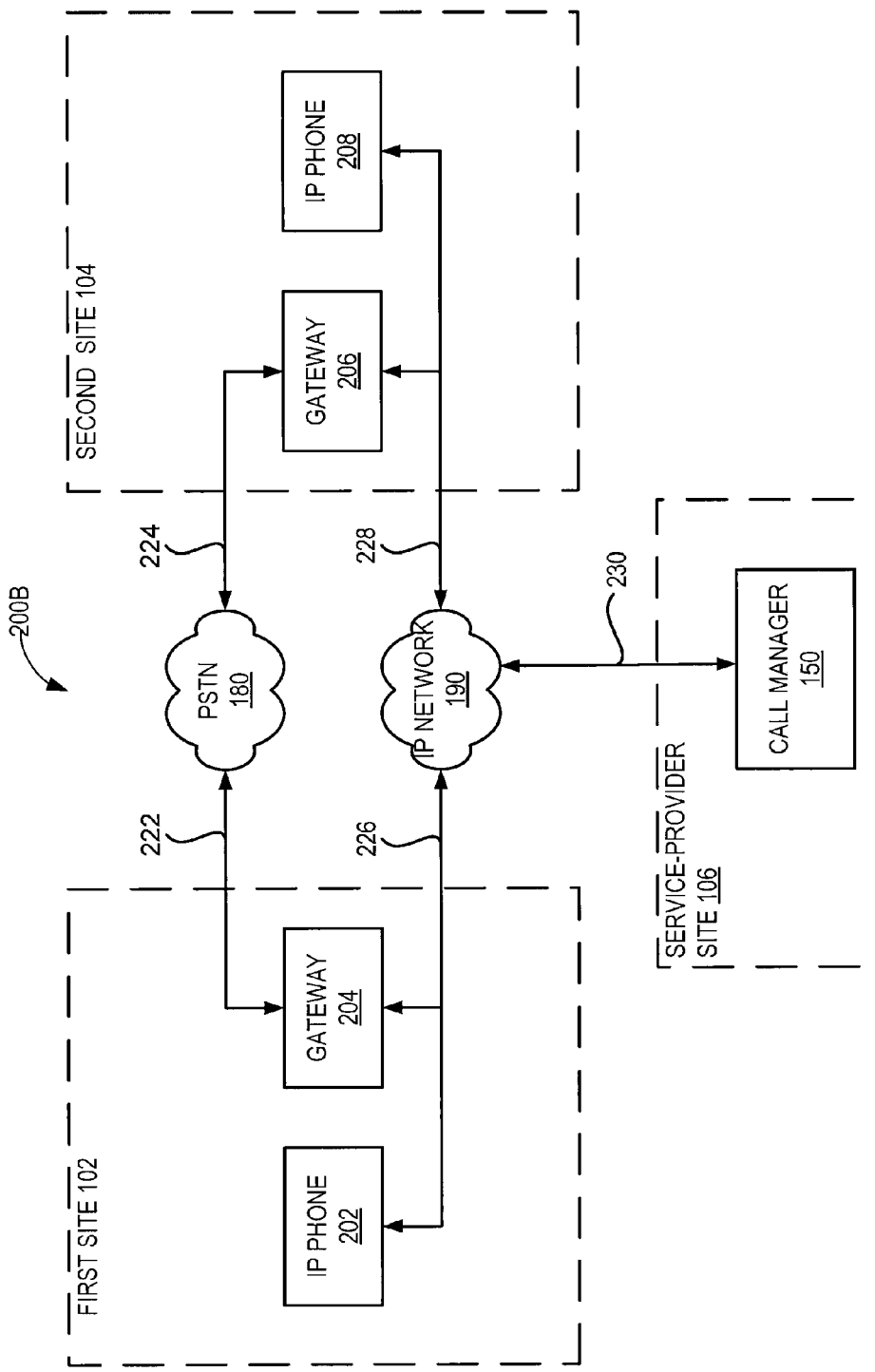

Referring now to FIG. 2B, a second embodiment of a system 200B having the first site 102, the second site 104 and a third site, a service-provider site 106 will be described. This second embodiment of a system 200B includes similar components to the first embodiment of the system 200A described above so that description will not be repeated here. Like reference numerals have been used for like components with similar functionality. However, this embodiment of the system 200B adds the service-provider site 106 that includes the call manager 150. The call manager 150 provides the same functionality as has been described above but is now located in the service-provider site 106 rather than the first site 102. The call manager 150 is coupled by signal line 230 to the IP network 190. FIG. 2B depicts the embodiment where call control is "in the cloud" as a service on the IP network 190.

Figure 2C:
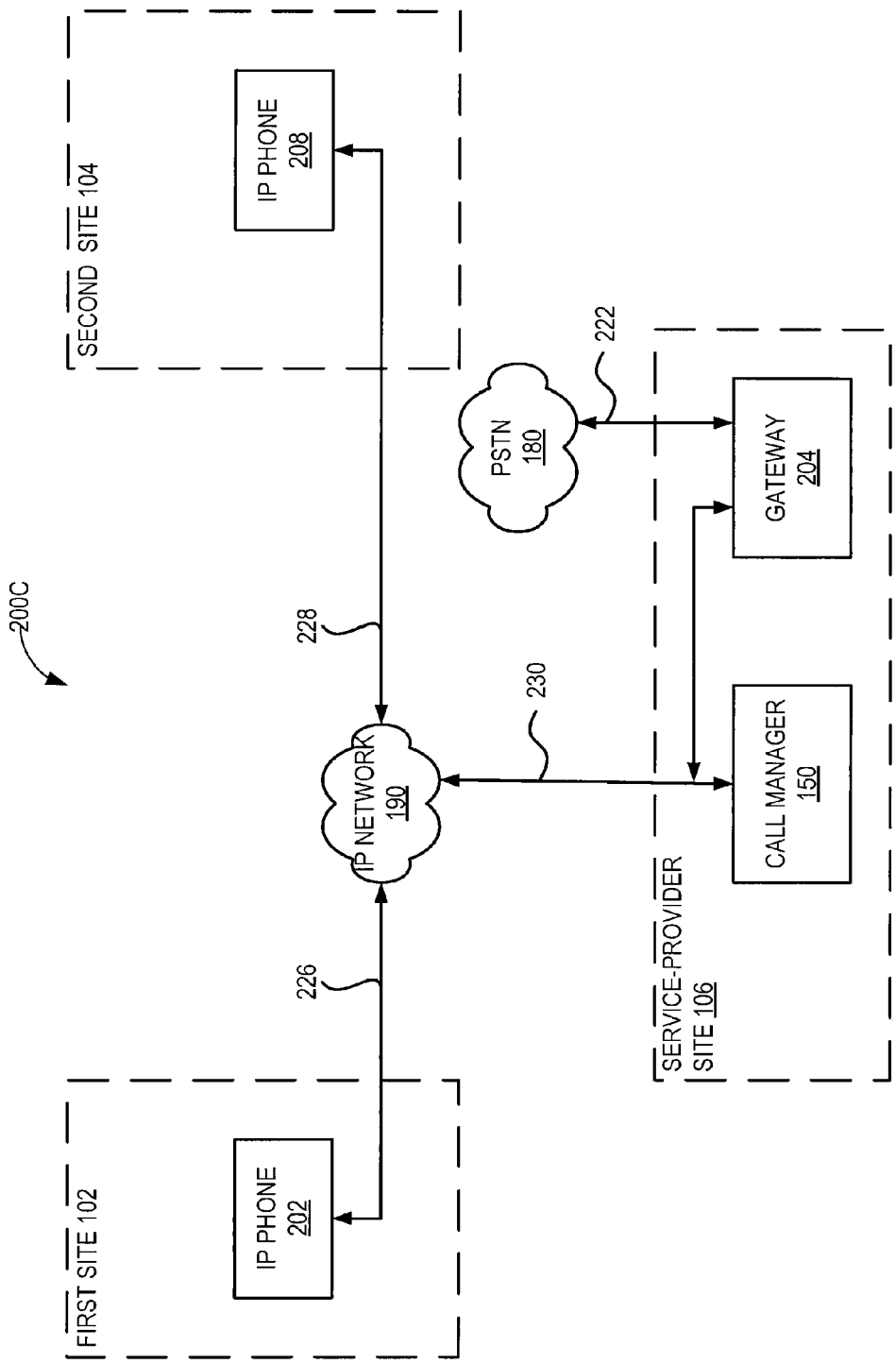

Referring now to FIG. 2C, a third embodiment of a system 200C having the first site 102, the second site 104 and a third site, a service-provider site 106 will be described. This third embodiment of a system 200C includes similar components to the first embodiment of the system 200A described above so again that description will not be repeated here. Like reference numerals have been used for like components with similar functionality. However, the third embodiment of the system 200C depicts an example topology where the third site 106 includes the call manager 150 and a gateway 204. The call manager 150 is coupled to the IP network 190 by signal line 230. The gateway 204 is also coupled to the IP network 190 by signal line 230. Additionally, the gateway 204 is coupled by signal line 222 to the PSTN 180. In this embodiment, the need for a gateway at each site 102 and 104 is obviated. The call manager cooperates with the gateway 204 to establish, set up and switch over the calls from the IP network 190 to the PSTN 180. The gateway 204 is coupled by signal line 222 to the PSTN 180 and can establish a PSTN call and set up the endpoints 202 and 208.

Figure 3:
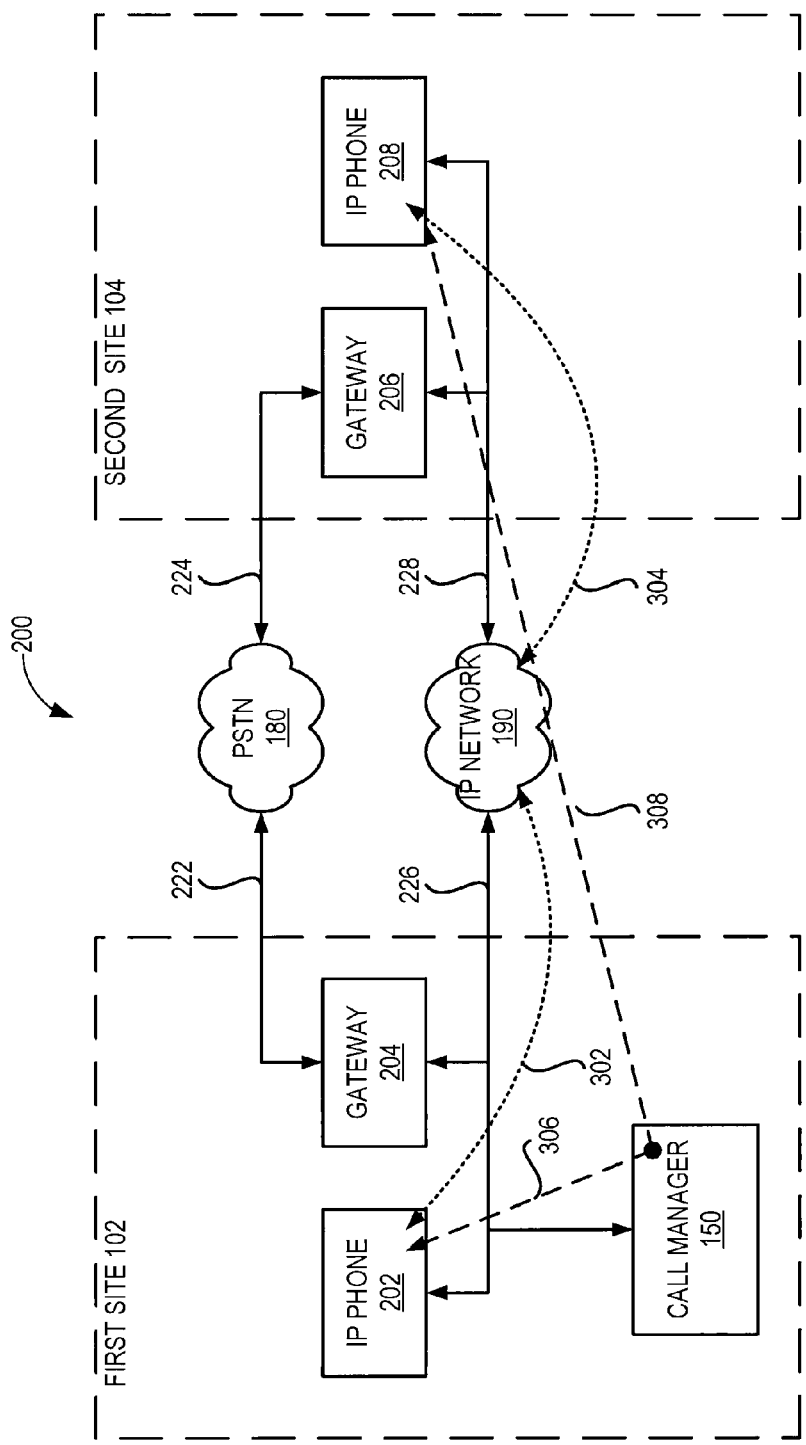
FIG. 3 is a block diagram illustrating the system of FIG. 2A showing a call using the IP network and for call control and data transmission according to one embodiment of the present invention.

Referring now to FIG. 3, initialization and establishment of a call within the IP telephony system 200A using the IP network 190 for both call control and data communication (or data connection or media transmission) is shown. FIG. 3 shows an IP call. The call is set up by call manager 150, and IP media (voice data) flows between the phones 202, 208 over the IP network 190 as indicated by dashed lines 302, 304. The IP network 190 is also used by the call manager 150 to send and receive call control signals to/from the IP phones 202, 208 as indicated by the dashed lines 306, 308, respectively.

There are occurrences when an IP call cannot be completed, or cannot provide acceptable voice quality to the user. The call may not be completed because there is a bandwidth limit on the IP network 190 and no more calls can be accepted. The IP network 190 may have congestion issues, causing packets to be lost or delayed, which makes the call difficult or impossible to understand. Under these conditions, the present invention advantageously places the call media on the PSTN 180 while retaining the IP network 190 for call control. Although the IP network 190 may not be performing well enough to carry voice, it performs well enough for call control, and thus present invention maintains the additional functionality provided by IP telephony. This is particularly advantageous because the present invention allows the continued use of Internet Protocol (IP) telephony call control features lacking in the PSTN trunks, giving it a functionality advantage.

Figure 4:
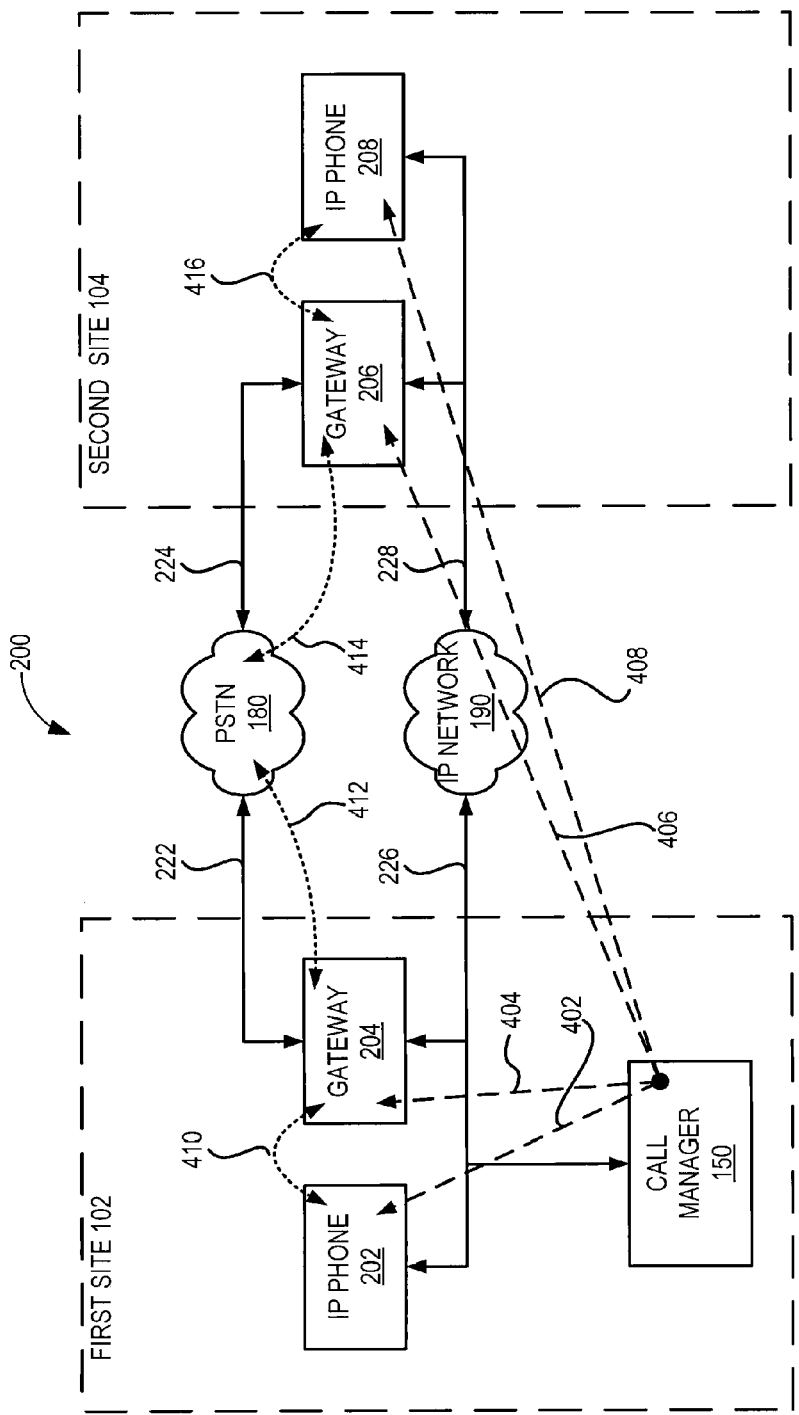
FIG. 4 is a block diagram illustrating the system of FIG. 2A showing a call using the IP network and for call control and the PSTN for data transmission according to one embodiment of the present invention.

Referring now also to FIG. 4, the modification of the call within the IP telephony system 200A to use the IP network 190 for call control and the PSTN 180 for data communication (or data connection or media transmission) is shown. FIG. 4 illustrates the case of IP PSTN fallback. Either at the initiation of the call or during the call, the call manager 150 detects that the IP network 190 is underperforming and places a PSTN call between two gateways 204, 206 that bypass the underperforming IP network 190. The originating gateway 204 uses PSTN signaling 412 to the answering gateway 206 (received as signal 414) to identify the IP call to allow the gateway 206 to convert the PSTN call to IP media packets and transmit the media packets to the receiving endpoint 208, and packets transmitted from this endpoint 208 are sent to the gateway 206, which transmits the media in the opposite direction to the originating gateway 204, which then forwards media packets to the originating endpoint 202. The IP network 190 is retained for call control, but the PSTN 180 is used for media transmission. Should the IP network 190 become capable of passing voice acceptably, the media path can be transferred back to the IP network 190 and the PSTN call can be dropped (See FIG. 12 below).

Figure 5:
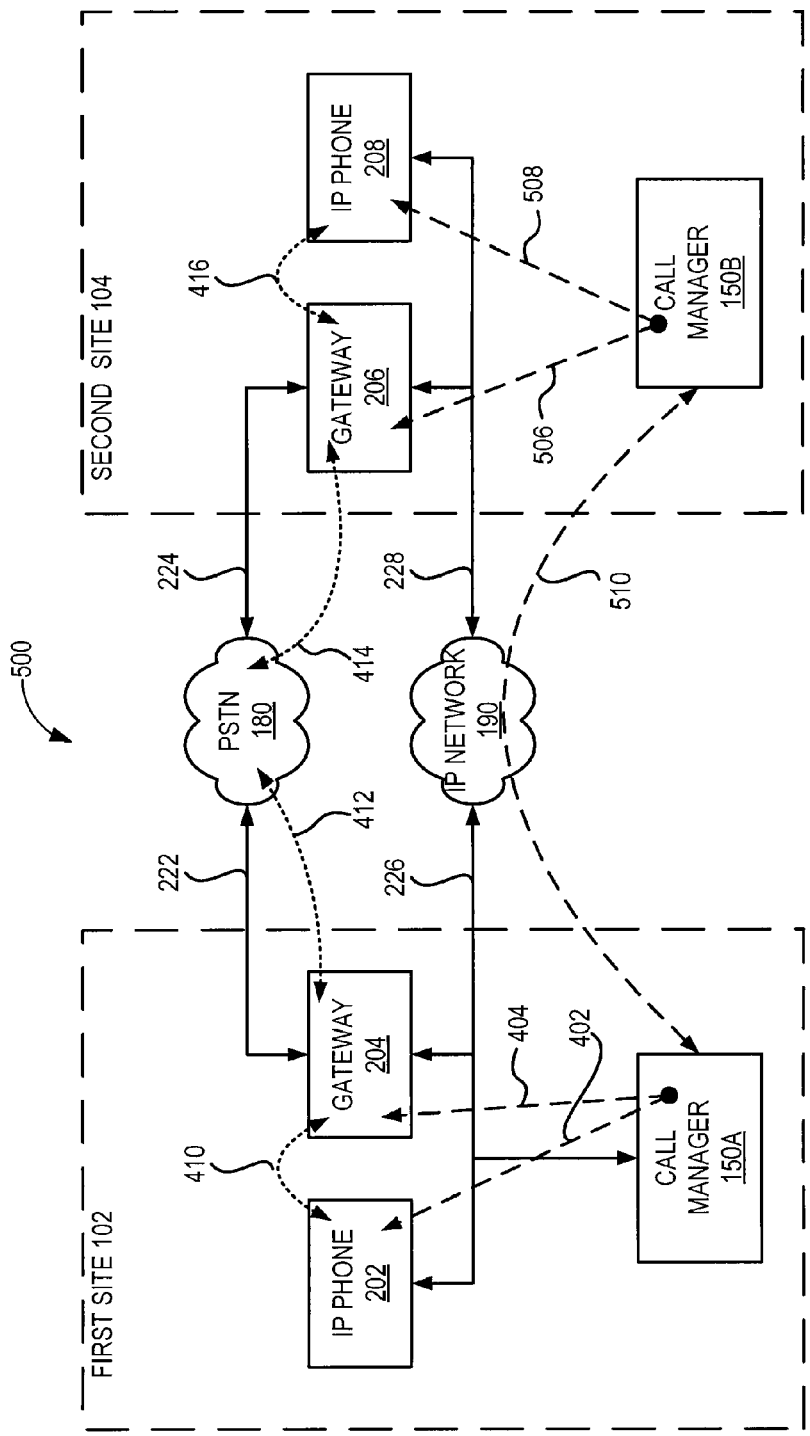
FIG. 5 is a block diagram illustrating a system having a first site and a second site each having a call manager according to one embodiment of the present invention.

The call is switched from the status shown in FIG. 3 to that of FIG. 4. The call manager 150 already has control of the IP phone 202 and the gateway 204 of the first site 102 as indicated by the dashed lines 402, 404 respectively. The call manager 150 also already has control of the IP phone 208 and the gateway 206 of the second site 104 as indicated by the dashed lines 408, 406, respectively. This enables the call manager 150 to control the gateways 204, 206 to set up a call between them on the PSTN 180. Next, the gateway 204 of the first site 102 calls the second site 104 gateway 206. When second site 104 gateway 206 answers the phone, it needs to know that this call is from gateway 204 and not just any call from elsewhere in the PSTN 180 to this number. The call manager 150 informs the gateway 206 of the incoming call and passes it an identifier (using 222/224) to disambiguate the call from other PSTN calls. The call manager 150 instructs gateway 204 to transmit the identifier using the PSTN 180. The solution is to signal on the PSTN 180 that this is a bypass call. There are multiple types of PSTN connections, and the signaling is different on each. If the PSTN connection is an analog phone line, then the signaling must be done in-band by inserting a tone or tones. This can be done in a manner similar to how FAX machines work. A simple way of signaling on an analog line that the call is for the first site 102 gateway 204 is to play one of the 4 special DTMF tones that can't be typed from a key pad—known as A, B, C or D when gateway 206 answers the phone, and gateway 206 acknowledges with one of the A, B, C or D tones. These tones cannot be generated by a normal telephone key pad, and are extremely unlikely to be generated by human voice or other audio. By increasing the exchange to several tones, the possibility of some other form of audio being present in the call can be eliminated. Once the call on the PSTN 180 is established, the call manager 150 directs the IP phones 202, 208 and the gateways 204, 206 to send the IP media (voice data) over the PSTN 180 as shown by dashed lines 410, 412, 414 and 416. The IP network 190 is also used by the call manager 150 to send and receive call control signals to/from the IP phones 202, 208 as indicated by the dashed lines 402, 408 respectively; and to the gateways 204, 206 as indicated by the dashed lines 404, 406 respectively Referring now to FIG. 5, another configuration of the system 500 of the present invention is shown. FIG. 5 illustrates an embodiment in which both the first site 102 includes a first call manager 150A and the second site 104 includes a second call manager 150B. As can be seen, the first call manager 150A of the first site 102 operates as has been described above to control IP phone 202 and gateway 204. The control between the call manager 150A, the IP phone 202 and gateway 204 are indicated by the dashed lines 402, 404, respectively. However, the second call manager 150B is included in the second site 104. The second call manager 150B assumes part of the responsibility formerly undertaken by the first call manager 150A. The second call manager 150B controls the operation of the gateway 106 and the IP phone 208 of the second site 104. The control between the call manager 150B, the IP phone 208 and gateway 206 are indicated by the dashed lines 508, 506, respectively. The second call manager 150B is also coupled for communication with the first call manager 150 as indicated by dashed line 510 to coordinate their actions. In the embodiment shown, the first call manager 150A and the second call manager 150B are coupled for communication by IP network 190, signal line 226 and signal line 228. Those skilled in the art will recognize that a variety of other means that allow the first call manager 150A to communicate with the second call manager 150B may alternatively be used. Collectively, the first call manager 150A and the second call manager 150B perform the functions as had been described above for the call manager 150 of FIG. 4.

Figure 6A:
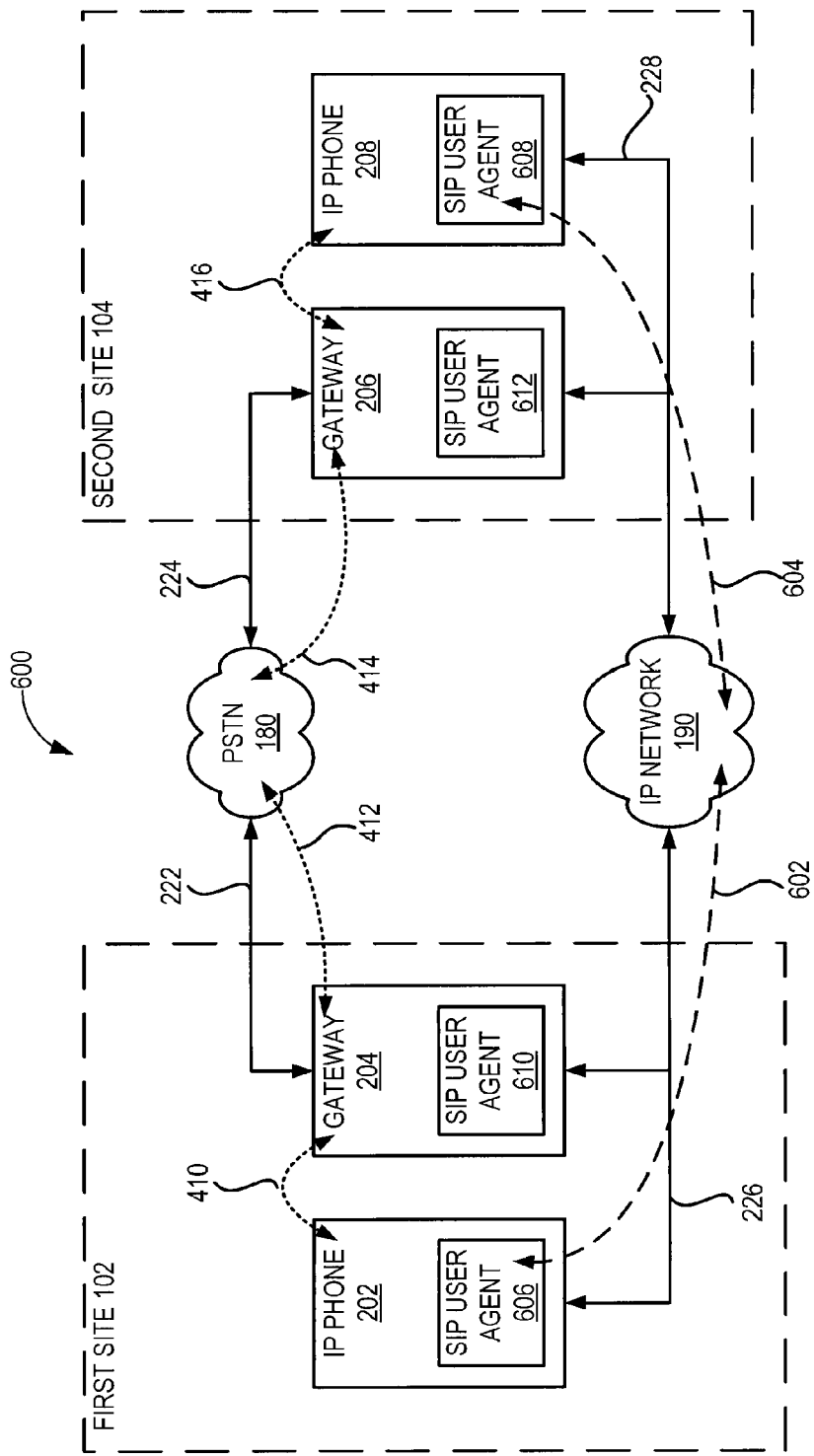
FIGS. 6A and 6B are block diagrams illustrating a system having a first site and a second site using peer-to-peer communication for call control and a PSTN for data transmission according to embodiments of the present invention.

Referring now to FIG. 6A, one embodiment of a system 600 implementing the present invention using peer-to-peer communication is shown. In this embodiment, a Session Initiation Protocol (SIP) user agent 606, 608 is incorporated into each IP phone 202, 208. A SIP user agent 610, 612 is also included the first and second gateway 204, 206. The SIP user agents 606, 608, 610 and 612 help route requests to the user's current location, authenticate and authorize users for services, and implement call-routing policies. The SIP user agents 606, 608, 610 and 612 communicate with each other using signal lines 226, 228 that represent the Local Area Network (LAN) of the first site 102 and the second site 104, respectively, and the IP network 190 that represents a Wide Area Network (WAN) 190. The SIP user agents 606, 608, 610 and 612 include functionality has been described above with reference to the call manager 150 for implementing the IP PSTN fall back functionality of the present invention.

Initially, the SIP user agents 606, 608, 610 and 612 establish the call over the LAN 226 of the first site, the IP network 190, and the LAN of the second site 228. In one embodiment, the call set up and management is done with the SIP user agent 606 of the IP phone 202 using the LAN 226, the IP network 190 and the LAN 228 to communicate with the SIP agent 608 of the IP phone 208 to establish a call using the IP network 190 for the media as indicated by dashed lines 602, 604. Once the call has been established with a media stream passing over the IP Network 190 between IP phone 202 and IP phone 208, the SIP user agent 606 of the IP phone 202 monitors for and detects poor network performance. For example, the SIP user agent 606 can do this by observing statistics on its own calls. If the SIP user agent 606 of the IP phone 202 detects poor quality, it contacts the SIP user agent 610 of the gateway 204 using the LAN 226. The SIP user agent 606 of the IP phone 202 tells the SIP user agent 610 of the gateway 204 to place a PSTN bypass call to gateway 206 and to signal on the PSTN to disambiguate from other calls. The SIP user agent 610 uses SIP to inform the SIP user agent 612 of gateway 206 about the PSTN bypass call and also passes along the disambiguation identifier. On completion of the call, the SIP user agent 612 of the gateway 206 provides a media path identifier to the SIP user agent 606 of IP phone 202. The SIP user agent 606 of IP phone 202 then contacts SIP user agent 608 of IP phone 208 with a SIP re-invite message to change the call's media path from the current one to one using the media identifier provided by SIP user agent 612 of gateway 206. The media then is removed from the IP network 190, and PSTN 180 bypass occurs, media flowing from IP phone 202 over 410 the first site 102 LAN 226 to the gateway 204, over 412,414 the PSTN to gateway 206, then over 416 the second site 104 LAN to phone 208. This configuration allows call control communication between the IP phone 202 of the first site 102 and IP phone 208 of the second site 104 to be undertaken with a peer-to-peer form of communication. One advantage of this configuration is that it obviates the need to have a separate call manager managing all the calls from a given site 102, 104. The communication for call control between the IP phone 202, the IP phone 208, the first gateway 204 and the second gateway 206 is performed by appropriate SIP user agents 606, 608, 610 and 612. The system 600 transitions from media/data communication path similar to that shown in FIG. 3 over the LAN 226, IP network 190 and LAN 228 to the PSTN fallback communication path shown in FIG. 6A over the LAN 226, PSTN 180 and LAN 228. By virtue of the peer-to-peer communication, all the advantages of IP telephony in terms of advanced call features can be maintained.

Figure 6B:
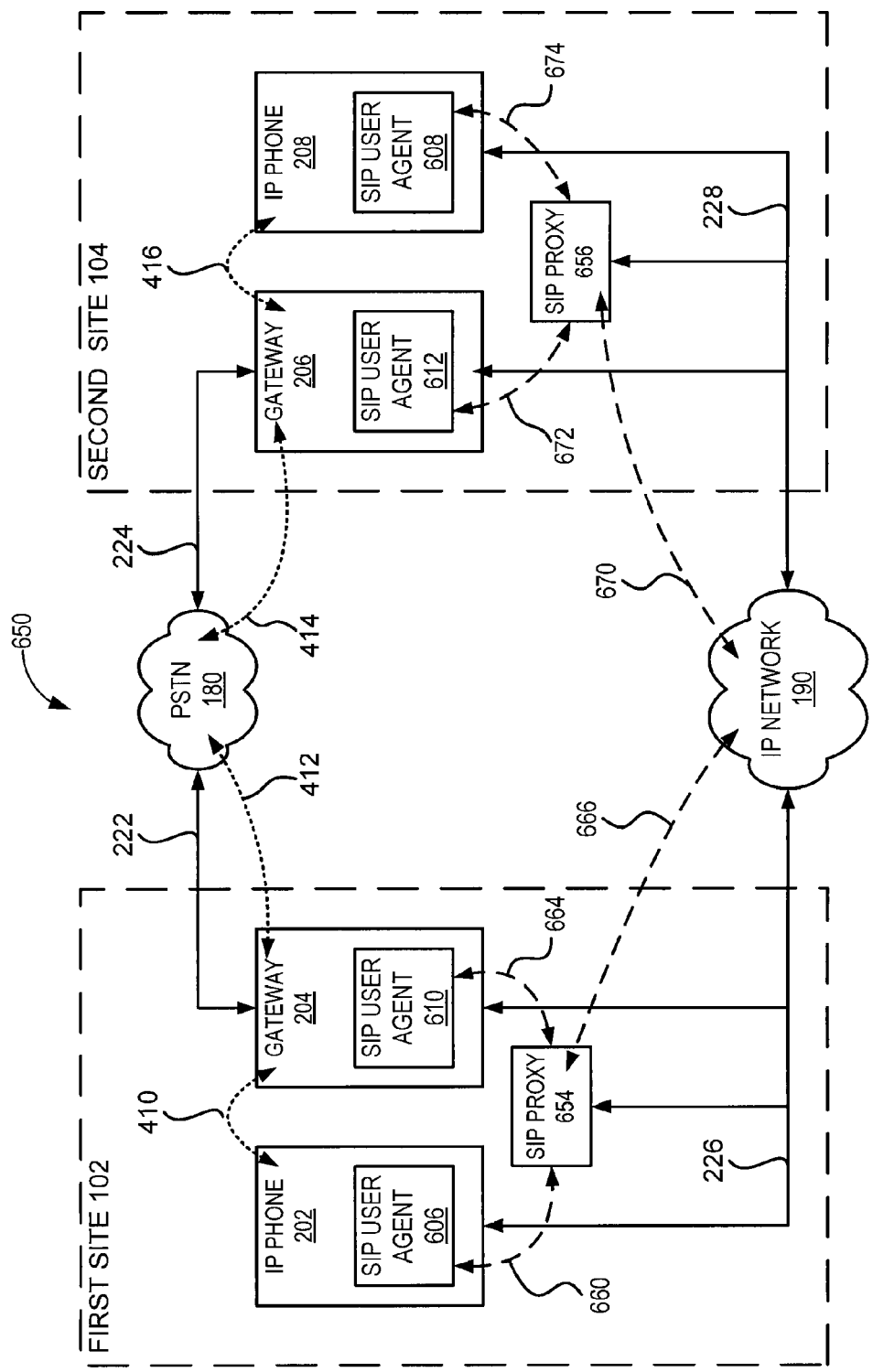

Referring now to FIG. 6B, another embodiment of a system 650 implementing the present invention using peer-to-peer communication is shown. The configuration of the FIG. 6B is similar to FIG. 6A in that SIP user agents 606, 608, 610 and 612 are incorporated into the IP phones 202, 208 and the first and second gateway 204, 206, respectively. The system 650 also includes a SIP proxy 654, 656 at each site 102, 104. The SIP user agents 606, 608, 610 and 612 and the SIP proxies 654, 656 communicate with each other as necessary using LANs 226, 228 and the IP network 190. The SIP user agents 606, 608, 610 and 612 and the SIP proxies 654, 656 implement the IP PSTN fall back functionality of the present invention. The control communication between the IP phone 202, the IP phone 208, the first gateway 204 and the second gateway 206 is performed by appropriate SIP user agents 606, 608, 610 and 612 and the SIP proxies 654, 656. For example, FIG. 6B illustrates how SIP user agent 606 and SIP user agent 610 communicate with SIP proxy 654 via LAN 226 as shown by dashed lines 660 and 664, respectively. The SIP user agent 606 and SIP user agent 610 can also communicate with each other through SIP proxy 654. The SIP proxy 654 communicates with SIP proxy 656 as shown by dashed lines 666 and 670. At the second site 104, the SIP user agent 612 and the SIP user agent 608 communicate with SIP proxy 656 as shown by dashed lines 672 and 674, respectively. The primary different between FIGS. 6A and 6B is that the SIP proxies 654, 656 handle the call control communication between the SIP user agents 606, 608, 610 and 612. Those skilled the art will recognize how the same call control to switch between a media path over the LAN 226, IP network 190 and LAN 228 to a media path over the LAN 226, PSTN 180 and LAN 228, or vice versa, can be implanted using the configuration of FIG. 6B, with the call control signals additionally being routed between SIP agents using 606, 608, 610 and 612 the SIP proxies 654, 656.

Figure 7:
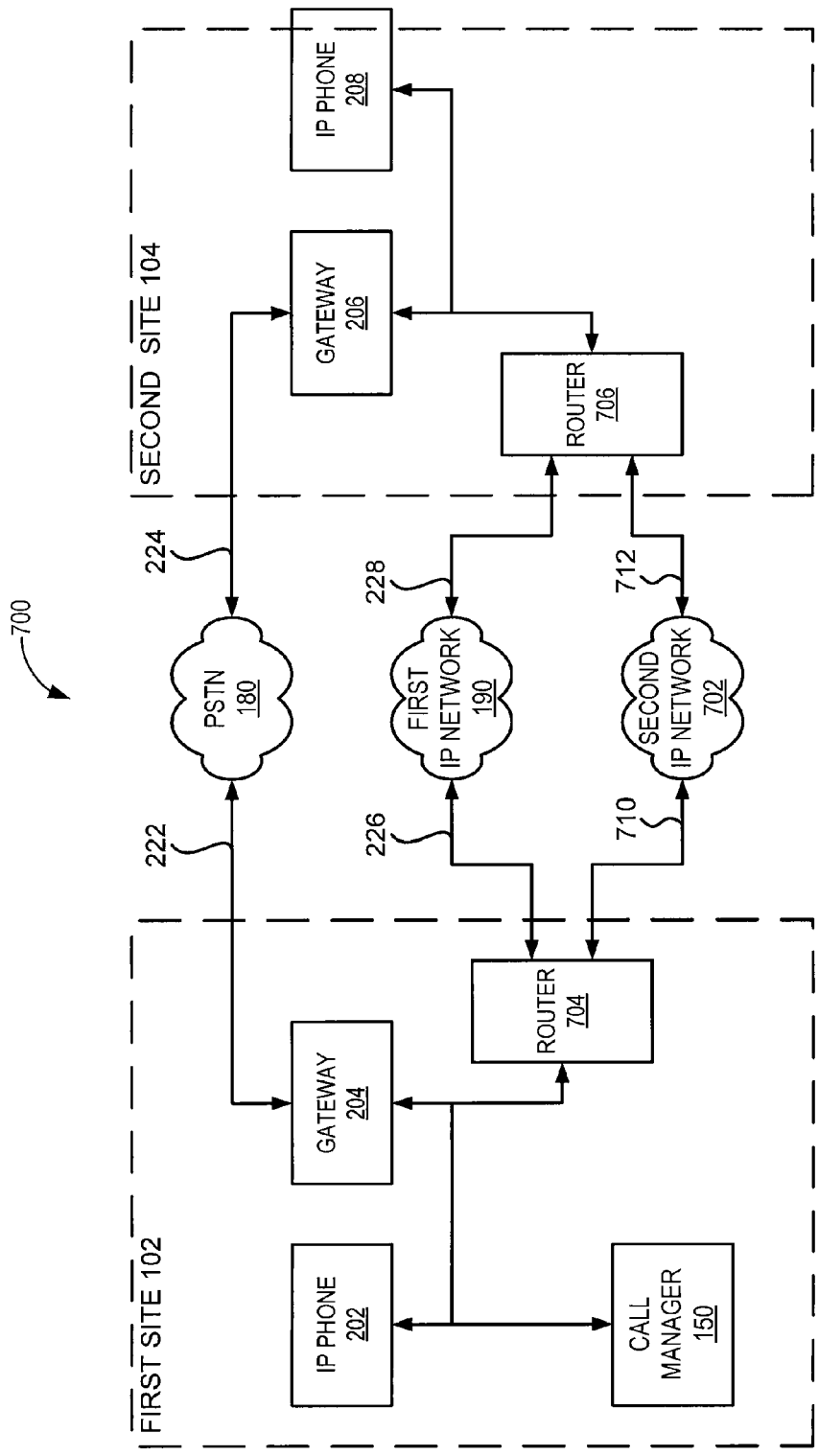
FIG. 7 is a block diagram illustrating a system having a first site and a second site coupled by a first IP network, a second IP network and a PSTN according to one embodiment of the present invention.

Referring now to FIG. 7, yet another embodiment for a system 700 in accordance with the present invention is shown. The system 700 of FIG. 7 is similar to that described above with reference to FIG. 2, but also includes a second IP network 702, and routers 704 and 706 are added to enable the first and second sites 102 and 104 to access both the first and the second IP networks 190, 702. When the call manager 150 determines to use the second IP network 702, it instructs the gateway 204 to mark the packets with a different priority. A common practice is DiffServ, which is used for quality of service settings in a network. The routers 704 and 706 are configured to send normal packets and normal media packets using the first IP network 190 and routes packets with a different priority to the second IP network 702. It should be obvious to one skilled in the arts that there may be other signaling techniques to indicate to a router which network path should be utilized. The system 700 illustrates how the present invention is used to improve quality of service by providing fallback for other types of networks such as the second IP network 702 in addition to or in contrast to the PSTN 180. This provides an additional level of reliability for both the data communication as well as the control communication. For example, for the system 700, the call manager 150 can be set to first fall back to the second IP network 702, and then to fall back to the PSTN 180.

Call Manager 150

Figure 8:
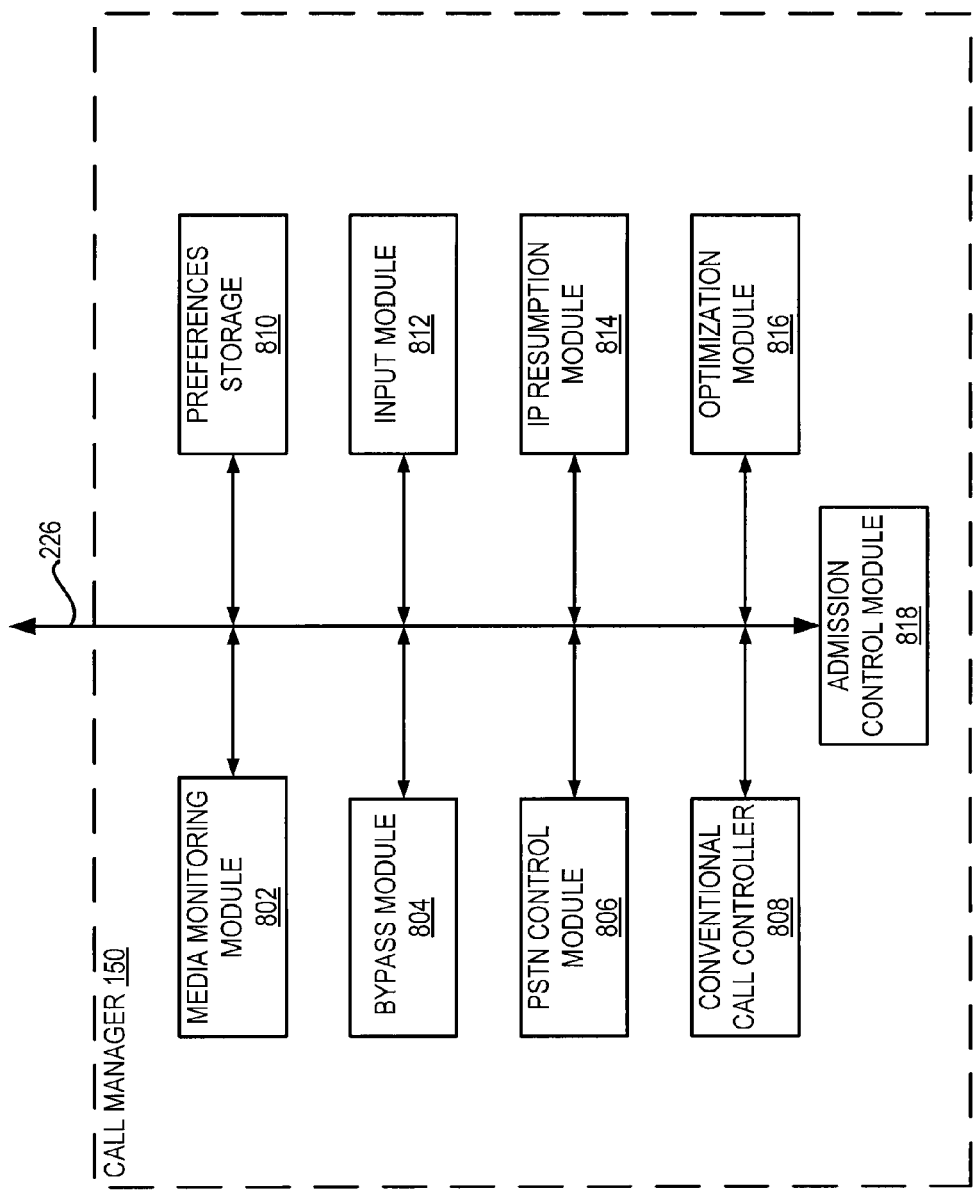
FIG. 8 is a block diagram illustrating a call manager according to one embodiment of the present invention.

Referring now to FIG. 8, one embodiment for the call manager 150 is shown. The call manager 150 comprises a media monitoring module 802, a bypass module 804, a PSTN control module 806, a conventional call controller module 808, a storage 810 for preferences, an input module 812, an IP resumption module 814 and an optimization module 816. In one embodiment, the media monitoring module 802, the bypass module 804, the PSTN control module 806, the conventional call controller module 808, the storage 810 for preferences, the input module 812, the IP resumption module 814 and the optimization module 816 are coupled to signal line 226 for communication with the other modules. These modules will be described below briefly but are also described below with reference to FIGS. 11 and 12.

The media monitoring module 802 is software and routines for determining the quality of service on the primary network. The media monitoring module 802 determines when there is sufficient network quality by looking at media statistics, particularly percentages of lost packets, and delayed packets on the IP network 190 for the call. The media monitoring module 802 also determines whether the IP network 190 is available at all. In one embodiment, in the media monitoring module 802 maintains a threshold for quality of service, and as long as the IP network 190 can maintain quality of service above that threshold then the media monitoring module 802 signals that fallback is not necessary. In another embodiment where the configuration includes two IP networks with 190, 702, the media monitoring module 802 also determines whether the second IP network 702 has sufficient quality of service for the call. The media monitoring module 802 signals the condition of the IP network 190 to the bypass module 804 and the conventional call controller 808. Those skilled in the art will understand that the media monitoring module 802 signals not only the transition in state from the IP network 190 being available with sufficient quality to available but insufficient quality to unavailable, but also the transition in state from the IP network 190 being unavailable to available.

The admission control module 818 is software and routines for determining the available bandwidth on the IP network 190, which may be the primary network, second network or other network. The admission control module 818 determines when there is sufficient bandwidth by looking at maximum permitted network utilization from preferences storage 810, and computing the amount of bandwidth consumed by current media. The admission control module 818 signals the available bandwidth of the IP network 190 to the bypass module 804 (if bypass to another IP network may be performed), conventional call controller 808 and IP resumption module 814.

The bypass module 804 is software and routines for switching the media transmission portion of the data communication from being on the IP network 190 to being on the PSTN 180. In embodiments that include the IP resumption module 814, the bypass module 804 also controls the switching of media transmission from being on the PSTN 180 for being on the IP network 190. The bypass module 804 sends and receives signals from the media monitoring module 802 for the current state of the IP network 190 and whether a fallback is necessary. The bypass module 804 communicates with the conventional call controller 808 to establish a call over the IP network 190. The bypass module 804 also signals the conventional call controller 808 to implement the advanced features offered in IP telephony systems. The bypass module 804 also communicates with the PSTN control module 806 to begin a call over the PSTN 180. The bypass module 804 is also coupled to communicate with the preferences storage 810 and receives user input via the input module 812. Basically, the bypass module 804 controls the operation of the present invention to implement fallback from the IP network 190 to the PSTN 180.

The PSTN control module 806 is software and routines for establishing a call over the PSTN 180. The PSTN control module 806 is adapted for communication with the bypass module 804, the IP resumption module 814 and gateways 204, 206. The PSTN control module 806 is responsible for managing (establishing and terminating) the call on the PSTN 180 between the IP phones 202, 208 and the gateways 204, 206. The PSTN control module 806 sends signals to the gateways 204, 206 to initiate a call on the PSTN 180, insert identifying signaling as part of the call set up and establish the calls so that the media transmission can be switched from the IP network 190.

The conventional call controller module 808 is software and routines for call control functionality as has been described above. For example, the conventional call control module 808 provides the advanced features IP telephony system such as but not limited to graphical user interface, directory, intercom, conference calling, pickup group, hunt group, etc. Those skilled in the art will recognize that as additional call control functionality is implemented, the present invention may be continued to be used with call controllers having additional functionality.

The storage 810 is used for storing preferences from the administrator, the user or both. In one embodiment, the bypass module 804 may have different conditions under which the PSTN fall back is initiated. The administrator can store preferences and storage 810 as to when and under what conditions the PSTN fall back should be used. For example, a preference could be set such that for all conference calls the PSTN 180 is used for the media transmission. Similarly, the user may store a smaller number of preferences such as a preference to have particular calls using the PSTN 180. In such a case, the bypass module 804 may prompt the user before switching to the PSTN 180. An additional example is for particular users that should be guaranteed a high quality of service, and if the IP network 190 is judged to have some chance of failing to provide quality of service, then this user's media will be placed on the PSTN 180. The storage 810 is adapted for communication with the bypass module 804 and the IP resumption module 814.

The input module 812 is software and routines for processing input from the user. The input module 812 receives signals from the IP phones 202, 208 and sends them to be bypass module 804 and/or the IP resumption module 814 for further processing. In one embodiment, the present invention request input from the user before switching between the IP network 190 and a PSTN 180 and vice versa. The input module 812 is responsible for receiving signals and sending them to the appropriate module.

The IP resumption module 814 is software and routines for switching of data communication from being on the PSTN 180 to being on the IP network 190. The IP resumption module 814 sends and receives signals from the media monitoring module 802 and admission control module 818 for the current state of the IP network 190 and whether media transmission can be switched back from the PSTN 180 to the IP network 190. The IP resumption module 814 communicates with the conventional call controller 808 to establish a call over the IP network 190. The IP resumption module 814 also signals the conventional call controller 808 to implement the advanced features offered in IP telephony systems. The IP resumption module also communicates with the PSTN control module 806 to end the call over the PSTN 180. The IP resumption module is also coupled to communicate with the preferences storage 810 and receives user input via the input module 812.

The optimization module 816 is software routines for managing the switching between the IP network 190 and the PSTN 180, and vice versa. In one embodiment, the optimization module 816 controls the bypass module 804 and the IP resumption module 814 such that switching occurs adaptively to ensure a predetermined quality of service by using variable amounts of the PSTN 180. The optimization module 816 can optimize the switching based on a number of different parameters such as quality of service, cost, minimum switching, etc. For example, the optimization module 816 may be used to ensure that there is at least a predefined quality of service such that the system 200A may intermittently fall back to using the PSTN 180 to ensure that level of quality. Similarly, the optimization module 816 may be used to ensure that the cost is minimized. Since the cost of using the IP network 190 is significantly less than using the PSTN 180 for communication between IP phones 202, 208, in this instance the optimization module 816 minimizes the occurrences when the system 200A switches to using the PSTN 180. Thus, the optimization module 816 might permit some call quality degradation to minimize the cost. The optimization module 816 is adapted for communication with the bypass module 804 and the IP resumption module 814.

Figure 9:
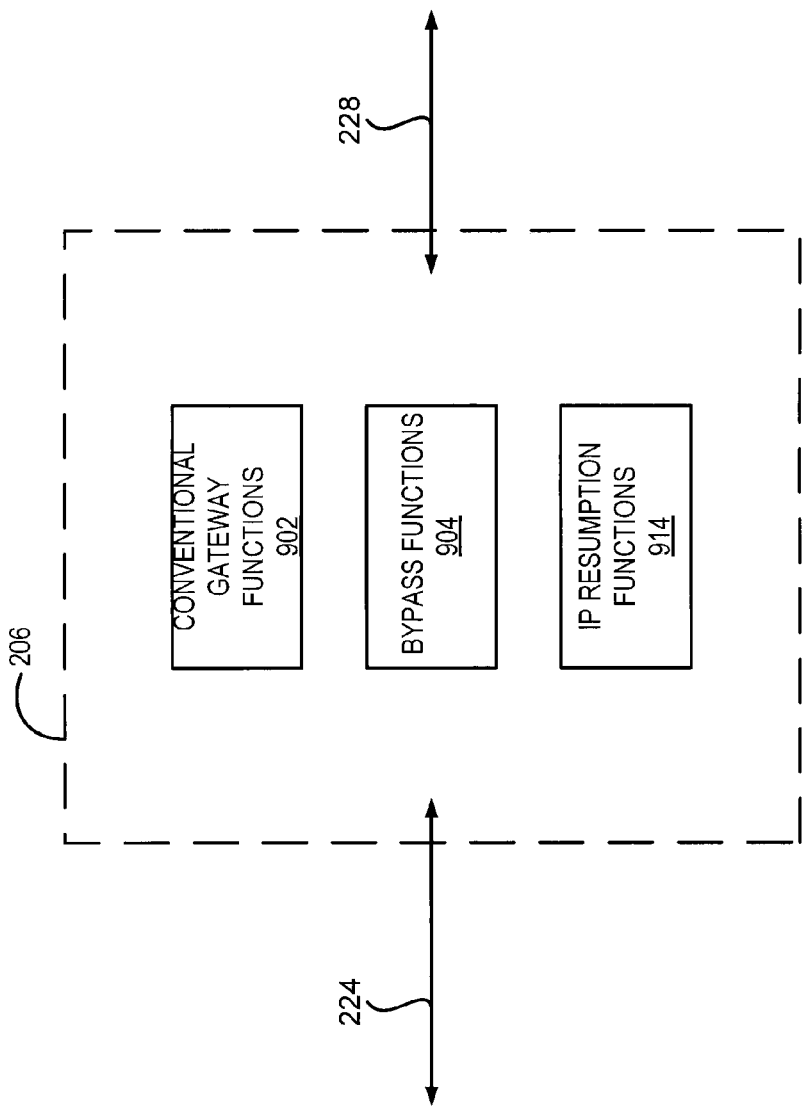
FIG. 9 is a block diagram illustrating a gateway according to one embodiment of the present invention.

Referring now to FIG. 9, an embodiment of the gateway 206 is shown. In accordance with the present invention, the gateway 206 includes conventional gateway functions 902, bypass functions 904 and IP resumption functions 914. The gateway 206 includes the conventional gateway functions 902 as will be understood by those skilled in the art. In addition, the present invention adds bypass functions 904 and IP resumption functions 914 to gateway. In one embodiment, the bypass functions 904 and the IP is resumption functions 914 are software or routines operational on the gateway 206. Those skilled in the art will recognize that these functions are modules or units. The bypass functions 904 include the operations described throughout this application for the gateway 206 to initiate and identify a call on the PSTN 180 as being associated with a particular IP phone. This includes both the initiation of the call at the sender's gateway by inserting or signaling call identification information as well as acceptance of the call at the receiver's gateway. This also includes association of a PSTN call with particular IP endpoints at both the sending gateway and receiving gateway. Furthermore, the bypass functions 904 include the control and operation of the reverse path of data from the receiver's gateway to the sender's gateway. Similarly, IP resumption functions 914 operate and control of the sender's and receiver's gateways to end the call over the PSTN 180.

Figure 10:
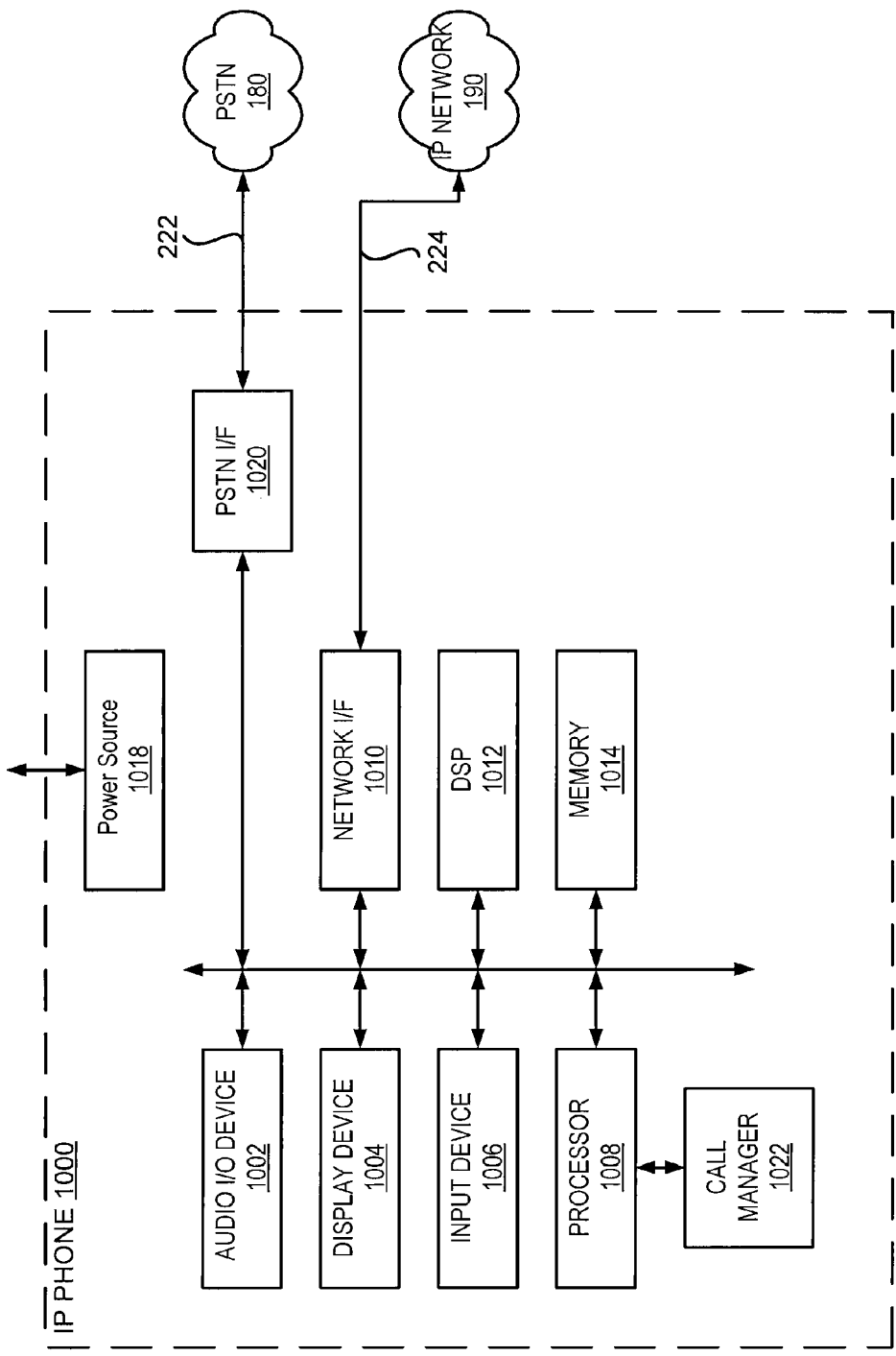
FIG. 10 is a block diagram illustrating an IP phone according to one embodiment of the present invention.

Referring now to FIG. 10, yet another embodiment of the present invention is shown. FIG. 10 illustrates an embodiment of the present invention integrated into an IP phone 1000. This embodiment of the IP phone 1000 includes conventional functionality for an IP phone including an audio input and output device 1002 such as one or more microphones and speakers, one or more display device 1004, an input device 1006, a processor 1008, a network interface 1010 such as an Ethernet connector, a digital signal processor (DSP) 1012, a memory 1014, and a power source 1018. The power source may be separate or coupled through the PSTN physical connection 222 or the IP network physical connection 224. These components cooperate in the conventional manner such as any of various examples included in IP phones commercially available. However, the present invention also includes a PSTN interface 1020 and a call manager 1022 in the IP phone 1000. The PSTN interface 1020 is coupled by signal line 222 to the PSTN 180. The network interface 1010 is coupled by signal line 224 to the IP network 190. The call controller 1022 is software on the processor 1008, coupled to the PSTN interface 1020 and PSTN 180, the IP network 190 and the network interface 1010. The network interface 1010 couples the other components of the IP phone 1000 to signal line 224 for communication over the IP network 109. The call manager is similar in functionality and operation to the call manager 150 described above. This embodiment of the present invention is particular the advantageous because it allows a single user remotely connected by an IP network 190 and a PSTN 180 to a site 102 to have the PSTN fall back functionality of the present invention. The IP phone 1000 need only be connected to the IP network 190 and the PSTN 180 as shown in FIG. 10 and the user has all the advantages of the present invention.

Methods

Figure 11:
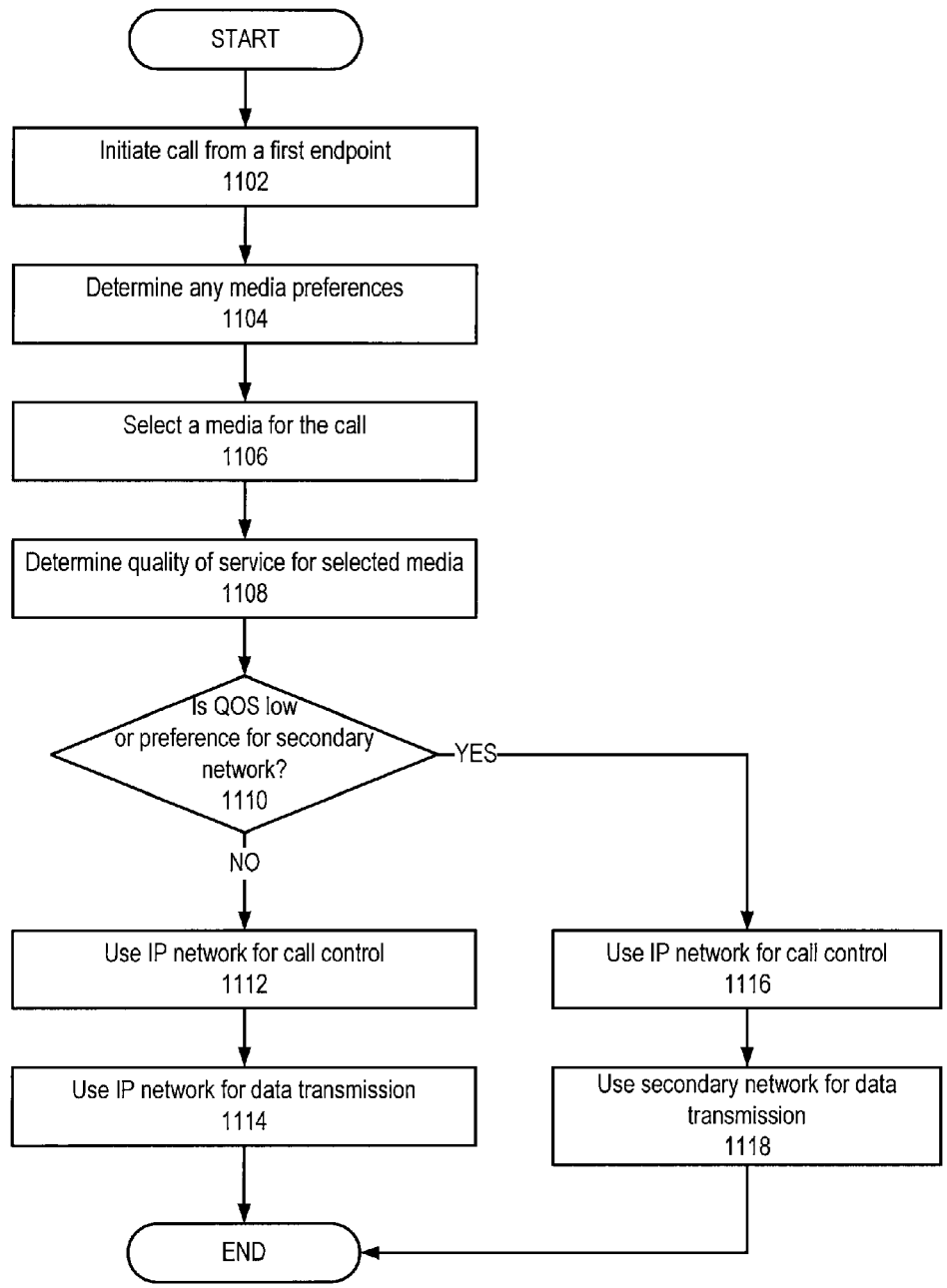
FIG. 11 is a flowchart illustrating a method for falling back to a secondary network to ensure call quality according to one embodiment of the present invention.

Referring now to FIG. 11, a method for falling back to a secondary network to ensure call quality according to one embodiment of the present invention. The process begins with a call being initiated 1102 from a first endpoint. For example, the IP phone 202 at the first site 102 initiates a call to the IP phone 208 at the second site 104, contacting call manager 150. Call manager 150 signals the second site 104 IP phone 208, and the phone 208 accepts the call. For the present invention it is assumed that the IP network 190 is available for call control, there is an available line for the first gateway 204, an available PSTN circuit, and an available line on a second gateway 206. Otherwise, the call fails and the user is informed. The method determines 1104 whether there are any media path preferences that have been set by the administrator or user and stored in storage 810. Next, the method selects 1106 a media for the call. The default is to select the IP network 190.

Next, the call manager 150 determines 1108 a quality of service for the selected media. This determination can be made by a manual setting made by an administrator, from an admission control module 818 indicating that the network 190 is at capacity, or from a media monitoring module 802. The media monitoring module 802 utilizes network statistics indicating the network has too high a loss, latency or jitter or from call statistics from calls on the network indicating unacceptable call quality. Note that prior to the call, user and phone state information for the destination of the call may be available via the IP network 190, maintained either by call manager 150 or an external service such as presence and instant messaging services.

Next, the call manager 150 determines 1110 whether the quality of service is low and PSTN bypass should be used, or whether the user or administrator has a preference for using the PSTN bypass. The fallback to the PSTN 180 may be done either because of, network bandwidth (call quality) or user preference. If it is determined in step 1110 the quality of service is not low and there is no user preference for the secondary network, then the method uses 1112 the IP network 190 for call control and use 1114 the IP network 190 for data transmission.

If it is determined in step 1110 that either the quality of service is low or there is a preference for use of the secondary network, the method uses 1116 the IP network 190 for call control and use 1118 the secondary network, PSTN 180, for data transmission.

For example, this method may be implemented as follows. The call manager 150 places a call from the gateway 204 of the first site 102 to the gateway 206 of the second site 104. The call manager 150 informs the gateway 206 of the incoming call and passes it an identifier to disambiguate the call from other PSTN bypass calls. The call manager 150 instructs gateway 204 to transmit the identifier using the PSTN 180. For example, this may be done using a) in dual tone generated by the gateway 204 or b) ISDN out of band signaling. The gateways 204, 206 first signal to ensure that the received call is the PSTN bypass call and not another call from the PSTN 180, and to acknowledge to the originating gateway 204 of the first site 102 that it successfully connected to the gateway 206 of the second site 104. In one embodiment, the gateways 204, 206 also provide security by increasing the number characters in the identifier or even encrypting the identifier. There are multiple ways to signal in-band. DTMF is the very common in telephony and AMIS (described in the publication entitled "Audio Messaging Interchange Specification (AMIS)—Analog Protocol", Version 1, Issue 2, published in February, 1992, by the Information Industry Association, Washington, D.C.) is an example. Telephony also uses MF tones, which are equivalent to DTMF tones, but different frequencies, and in alternate embodiments are used for signaling. Faxing is yet another way to do in-band signaling, and there are a variety of modem protocols that could be used to signal between the gateways. A third method is to use modem protocols, such as Bell 202, Bell 201A, Bell 201B, Bell 103A, V.21, V.22 and others. The call manager 150 then sets up a media path between the IP phone 202 and gateway 204 of the first site 102 and between the gateway 206 and IP phone 208 of the second site 104. All features and control information are preserved between the phone users and the phones as in a normal IP call, with the exception of the media.

Figure 12:
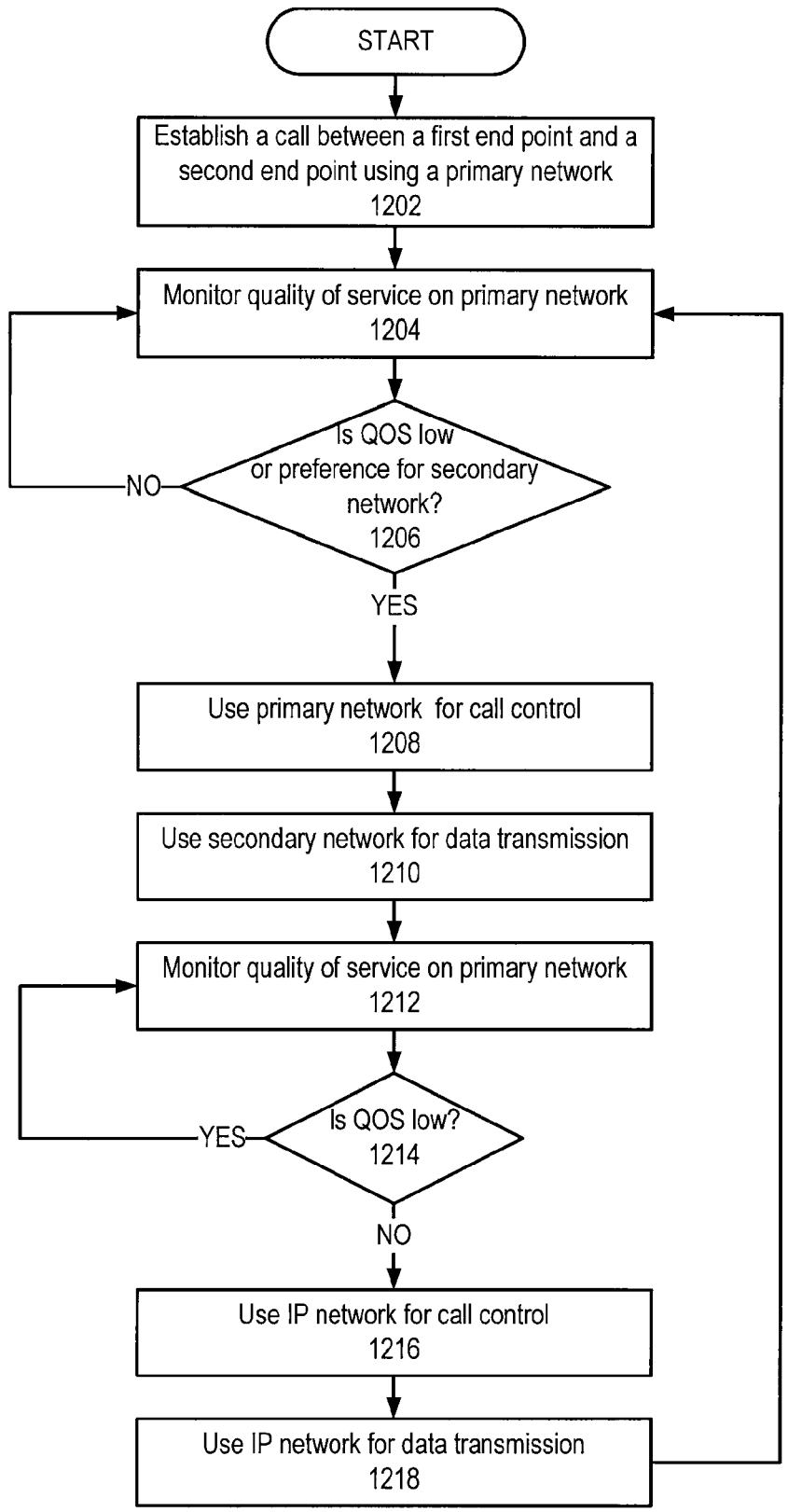
FIG. 12 is a flowchart illustrating a method for dynamically switching between a primary and a secondary network to ensure call quality according to one embodiment of the present invention.

Referring now to FIG. 12, a method for dynamically switching between a primary and a secondary network according to one embodiment of the present invention will be described. The method begins by establishing 1202 a call between a first endpoint and a second endpoint using a primary network, for example, the IP network 190. Then the method monitors 1204 the quality of service on the primary network. This call could be purely a test call by the call manager to determine a network's quality of service, by instructing the first endpoint and a second endpoint to pass media, but not play audio out a speaker. Next method determines 1206 whether quality services low or there is a preference for the secondary network, for example, the PSTN 180. If quality of service is not low and there is no preference for a secondary network, the method returns to step 1204 to monitor the quality of service on the primary network and the call is maintained over the primary network. On the other hand, if quality service is low (below a threshold) or there is a preference for secondary network, the method continues to use 1208 the primary network for call control. However, the method uses 1210 the secondary network for data/media transmission. While the secondary network is being used for media transmission, the method monitors 1212 the quality of service on the primary network. The method then determines 1214 whether the quality of service is still low. (This is determined by other calls completing or in progress. There are typically a number of calls using the network, and the result of each is monitored.) If the quality of service continues to be low, the method returns to step 1212 to monitor the quality of service on the primary network. If the quality of service is determined to be no longer low in step 1214 (by using one or more test calls, as there would be no calls placed over the network if quality of service had been determined to be too low), the method again continues to use 1216 the IP network 190 for call control. Then the method switches 1218 back to using the IP network for data transmission after which the method continues back to step 1204 to monitor the call be of service.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for falling back from a primary network to a secondary network to ensure call quality in a distributed telephony system, the method comprising:
    initiating a call from a first endpoint to a second endpoint; using the primary network for call control;
    determining whether any defined network preference describing a preference for using the secondary network is stored, wherein the defined network preference is defined by a user or an administrator;
    determining whether the primary network can be used for data transmission based at least in part on the determination of whether any defined network preference is stored; and
    if it is determined that the primary network cannot be used for data transmission, using the secondary network for data transmission and the primary network for call control while using the secondary network for data transmission, wherein the primary network is an IP network.

2. The method of claim 1 wherein the secondary network is a PSTN.

3. The method of claim 1 wherein call control includes one from a group of transfer, conference, directory listing, callee status, a graphical interface, voice messaging, instant messaging and text messaging.

4. The method of claim 1 wherein the defined network preference includes one or more of a class of service and a preference to use the secondary network for an important call, a conference call or a collaboration call.

5. The method of claim 1 wherein determining whether the primary network can be used for data transmission includes determining whether a quality of service on the primary network is above a predetermined threshold.

6. The method of claim 1 wherein determining whether the primary network can be used for data transmission includes determining whether the primary network has sufficient quality.

7. The method of claim 1 wherein using the secondary network for data transmission includes initiating another call between a first gateway and a second gateway over a PSTN.

8. The method of claim 7 further comprising sending a first signal to the first gateway to include an identifier in the another call over the PSTN and sending a second signal to the second gateway including the identifier to disambiguate the another call from other PSTN calls.

9. The method of claim 1 wherein the call is between three or more endpoints.

10. A method for dynamically switching between a first network and a second network in a distributed telephony system, the method comprising:
    establishing a call from a first endpoint to a second endpoint using the first network;
    monitoring the first network for a quality of service;
    determining whether the quality of service on the first network is below a predefined threshold;
    determining whether any defined network preference describing a preference for using the second network is stored, wherein the defined network preference is defined by a user or an administrator;
    responsive to determining that a defined network preference is stored and that the quality of service is below the predefined threshold,
    using the first network for call control, wherein the first network is an IP network; and
    using the second network for data transmission while using the first network for call control;
    continuing to monitor the first network for the quality of service; and
    if the quality of service is above the predefined threshold, switching data transmission to the first network.

11. The method of claim 10 wherein the second network is a PSTN.

12. The method of claim 10 wherein monitoring the first network for the quality of service includes: monitoring for an availability of the first network, monitoring for the quality of service of transmission over the first network or monitoring for any stored defined network preference.

13. The method of claim 10 wherein the call is between three or more endpoints.

14. An apparatus for switching a call from a first network to a second network of a distributed IP telephony system, the apparatus comprising:
    a first gateway coupled to the first network and the second network for interconnecting with the first network and the second network;
    a second gateway coupled to the first network and the second network for interconnecting with the first network and the second network; and
    a first controller for setting up and controlling a call, the first controller sending control signals to the first gateway and the second gateway, the first controller for determining whether any defined network preference describing a preference for using the second network is stored, wherein the defined network preference is defined by a user or an administrator and, responsive to determining that a defined network preference is stored using the first network for call control while establishing the call on the second network, the first controller coupled to the first gateway, the second gateway and the first network, wherein the first network is an IP network.

15. The apparatus of claim 14, wherein the second network is a PSTN.

16. The apparatus of claim 14, wherein the first controller is part of the first gateway, the second gateway, an IP phone, a server, or other device coupled to the distributed IP telephony system.

17. The apparatus of claim 14 further comprising a second controller, the second controller coupled to the first controller and the second gateway, the second controller adapted to cooperate with the first controller to establish the call on the second network responsive to determining that a defined network preference is stored.

18. The apparatus of claim 17 wherein the first controller, a first IP phone and the first gateway are part of a first site, and the second controller, a second IP phone and the second gateway are part of a second site.

19. The apparatus of claim 17 wherein the first controller and the second controller use a SIP protocol to communicate with each other.

20. The apparatus of claim 14 further comprising:
    a third gateway coupled to the first network and a third network for interconnecting with the first network and the third network;
    a fourth gateway coupled to the first network and the third network for interconnecting with the first network and the third network; and wherein the first controller sets up and controls calls over the third network if the first network is not available, the first controller coupled to the third gateway and the fourth gateway.

21. The apparatus of claim 14 wherein the first controller comprises an admission control module for determining whether the first network has sufficient bandwidth for the call.

22. The apparatus of claim 14 wherein the first controller comprises a bypass module for switching data communication (media transmission) from being on the first network to being on the second network.

23. The apparatus of claim 14 wherein the first controller comprises a resumption module for switching of data communication from being on the second network to being on the first network.

24. The apparatus of claim 14 wherein the first controller comprises an optimization module for managing switching between the first network and the second network, and between the second network and the first network, the optimization module controlling switching to occur adaptively to ensure a predetermined quality of service.

25. A device comprising:
   an IP phone having a display, an input device, a speaker, a microphone, a processor, a memory and a first communication interface to a first network;
   a second communication interface to a second network; and
   a controller for switching between communicating using the first communication interface to communicating using the second communication interface, the controller for determining whether any defined network preference describing a preference for using the second network is stored, wherein the defined network preference is defined by a user or an administrator and, responsive to determining that a defined network preference is stored, using the first network for call control while establishing a call on the second network, wherein the first network is an IP network.

26. The device of claim 25 wherein the controller is also for setting up calls and controlling calls, the controller coupled to the first network, the controller sending control signals to the second network.

27. The device of claim 25, wherein the second network is a PSTN.

28. The device of claim 25, wherein the controller comprises an optimization module for managing switching between the first network and the second network, and between the second network and the first network, the optimization module controlling switching to occur adaptively to ensure a predetermined quality of service.

29. The device of claim 25, wherein the controller determines if the first network is available, and if the first network is not available, the controller sets up the call on the second network.

* * * * *